June 16, 1964 M. E. DOYLE 3,137,770

TELEPHONE CALL HOLDING ARRANGEMENT

Filed Nov. 17, 1961 2 Sheets-Sheet 1

INVENTOR
M. E. DOYLE
BY [signature]
ATTORNEY

June 16, 1964 M. E. DOYLE 3,137,770

TELEPHONE CALL HOLDING ARRANGEMENT

Filed Nov. 17, 1961 2 Sheets-Sheet 2

INVENTOR
M. E. DOYLE
BY
[signature]
ATTORNEY

United States Patent Office 3,137,770

Patented June 16, 1964

3,137,770

TELEPHONE CALL HOLDING ARRANGEMENT

Michael E. Doyle, Springfield, Ill., assignor to American Telephone and Telegraph Company, New York, N.Y., a corporation of New York Filed Nov. 17, 1961, Ser. No. 153,070
20 Claims. (Cl. 179—18)

Figure 1:
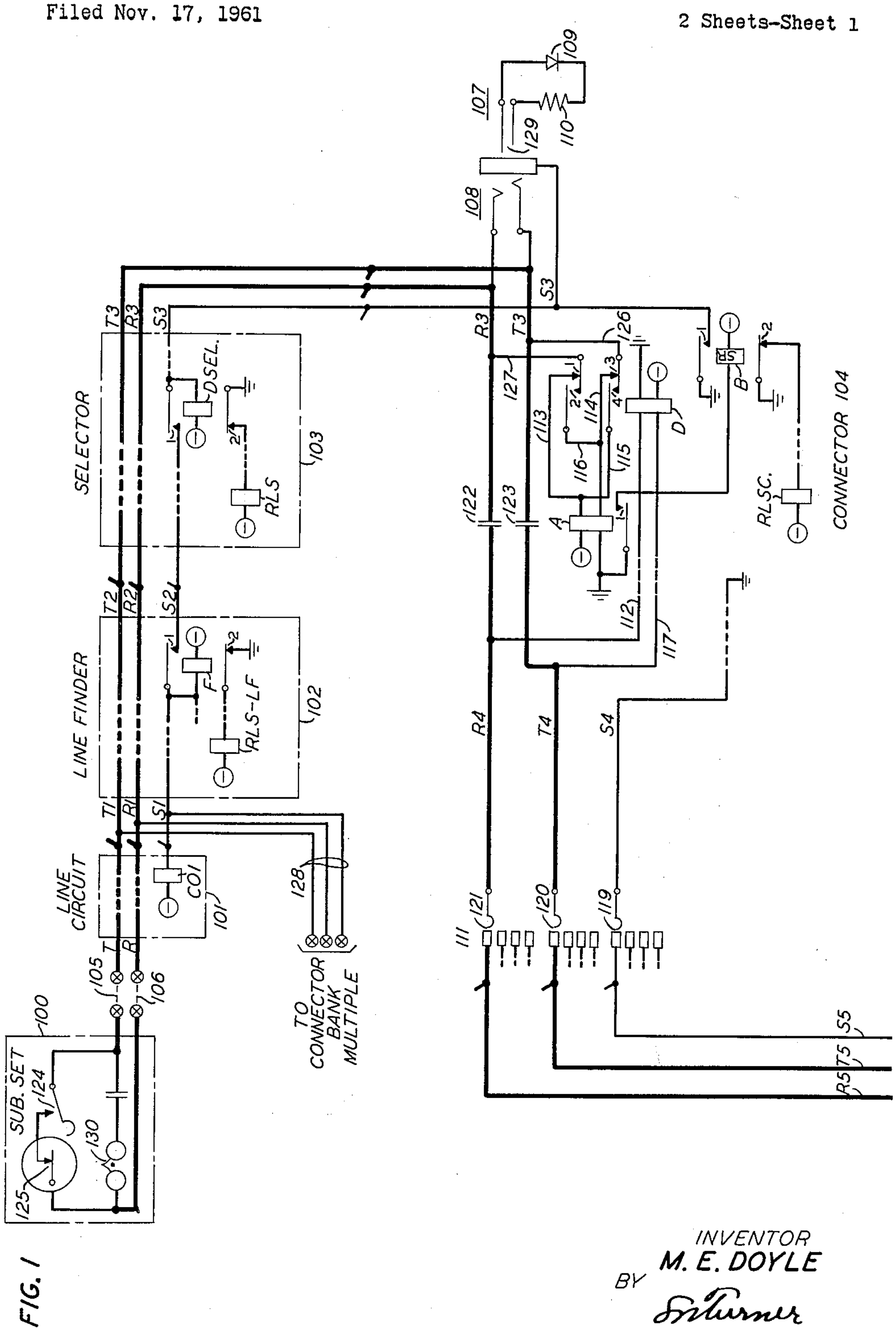

My invention relates to automatic telephone systems and more particularly to the control of the equipment used in such systems to interconnect calling lines with called lines.

In a more particular aspect, my invention relates to apparatus employed for specifically controlling the release of such equipment to permit certain calls to be traced.

In automatic telephone systems it is sometimes desirable to provide service whereby a called subscriber can effectively hold or trap a connection made to his telephone to permit an attendant to trace the call to its origin. Telephone subscribers are occasionally annoyed or insulted by anonymous calls, and in police work the need arises for determining the source of certain calls. Various expedients have been used in the past; however, these expedients lack certain features which I have incorporated in the present invention.

There are many known prior art arrangements which permit a called subscriber to trap or hold a connection for tracing. Some of these arrangements enable a called subscriber to alert the central office attendant so that he may trace the call back to the calling party. There are also other arrangements that require the called party to operate a special device at his station, such as a key, to actuate the call holding equipment, and in many of these prior art circuits the called subscriber must leave his receiver off-hook or engage the calling party in conversation to hold the connection while the attendant traces the call.

There are also other arrangements for automatically tracing calls which usually require elaborate and expensive control equipment.

In addition, some prior art circuits require permanent modifications to existing switching equipment that is common to a group of subscribers. With this latter arrangement all subscribers in a group are furnished with the trapping service whether or not they require it, and some of these subscribers may be prone to using the service maliciously.

It is, therefore, an object of my invention to provide an improved call holding arrangement applicable to automatic telephone systems for permitting a called subscriber to trap or hold a connection.

It is another object of my invention to provide an arrangement of the aforementioned type wherein no special signaling device is required at the called telephone station.

It is still another object of my invention to provide a call holding arrangement that is selectively connectable to any subscriber's line.

It is a further object of my invention to provide a call holding arrangement, as described above, whereby the problem of accidentally or maliciously trapping calls by unauthorized persons is greatly reduced.

It is another object of my invention to provide a call holding arrangement without requiring a change in the existing switching equipment.

It is a further object of my invention to provide a call holding arrangement that will enable the called party to use his telephone for subsequent calls while a call to his line is being traced.

The present invention is of particular utility in that, in addition to providing many of the features individually present in the prior art circuits, I have provided new features to alleviate the deficiencies of the prior arrangements.

In one exemplary embodiment of my invention described herein I illustrate how my holding circuit may be used in the familiar step-by-step type of telephone switching system. The operation of this system is well known in the art and requires only a brief description in order to understand my invention.

It will be obvious to those skilled in the art that my invention is applicable to many other types of telephone systems and not limited to use in a step-by-step system.

It is well known that a talking connection is established between a calling subscriber's line and a called subscriber's line in a step-by-step system by using a line finder, one or more intermediate selector switches and a connector switch. The line finder, in this case, seeks and finds the calling line and connects it to a dial tone source at the first selector. The calling subscriber dials the first digit, say a five, of the called subscriber's three-digit number and steps the selector switch up to the fifth level. The selector switch then hunts over the fifth level for an idle connector switch which serves telephone numbers in the 500 to 599 series. When an idle connector switch is found, the selector switch stops and cuts the calling subscriber's line through to the connector switch. The connector switch is then in a position to be stepped "up" to a level corresponding to the tens digit of the called number and "over" to a bank terminal corresponding to the units digit of the called number under control of the calling subscriber.

I have provided a call holding circuit that is selectively connectable to any line desiring this call trapping service. This can be conveniently done at any of the distributing frames in the central office. For instance, in the step-by-step type of central office described, one would disconnect the cross-connection wires that would normally interconnect the connector bank multiple with the line circuit for a particular subscriber, and insert my call holding circuit in between by connecting the trap circuit to both the line circuit and the connector bank multiple.

In addition, the central office attendant would preset the holding circuit in accordance with a preselected secret code. This is accomplished by connecting a detecting relay to a particular contact of a rotary stepping switch. The contact selected is associated with a particular stepped position of the switch and represents a particular code that the called subscriber must dial to actuate the holding circuit. Furthermore, a special trap plug is inserted in the test jack of each of the connector switches serving the subscriber provided with this service to convert the regular connector switch supervision to "last party disconnect" supervision, and of course, the subscriber is notified of the code necessary to actuate the trap.

Assuming that a call has been extended from a calling line to this particular called subscriber's line and the called subscriber determines from the nature of the call that he would like this call traced, he merely dials the preselected code. Translating arrangements in the holding circuit respond to his dial pulses and determine if he has dialed the prearranged code. Upon detecting receipt of the proper code, the called line is disconnected from the connection and his station bridge is replaced with an artificial resistance bridge to hold the connection. In addition, the central office attendant is alerted by an alarm denoting that a call is to be traced.

The holding circuit has now assumed control of the connection, independently of the calling party's attempt to disconnect, and will remain in this state until the attendant releases the circuit.

By disconnecting the called subscriber's line circuit from the talking connection in the manner described above, the called subscriber is still able to initiate calls using his regular line circuit and its associated line finder equipment while the trapped call is being traced. Furthermore, the called subscriber can also receive calls over this line if he is provided with an alternate telephone number having different connector bank terminals that are wired directly to his line circuit bypassing the trap circuit.

With this latter arrangement the attendant can hold the connection and notify the subscriber of its origin over the subscriber's regular line without requiring the called subscriber to monitor on his line while the call is being traced.

Accordingly, one feature of my invention resides in the means by which my circuit is connectable to any desired line.

Another feature of my invention is found in the means for temporarily converting the supervision of the connector switch to last party disconnect supervision.

A further feature of my invention is found in the circuitry responsive to the customer's regular dialing device.

Still another feature of my invention resides in the translating and detecting means that is effective only upon receipt of a prearranged coded signal.

Another feature found in my invention is the transfer circuitry which disconnects the called line from the connection while still holding the connection.

Figure 2:
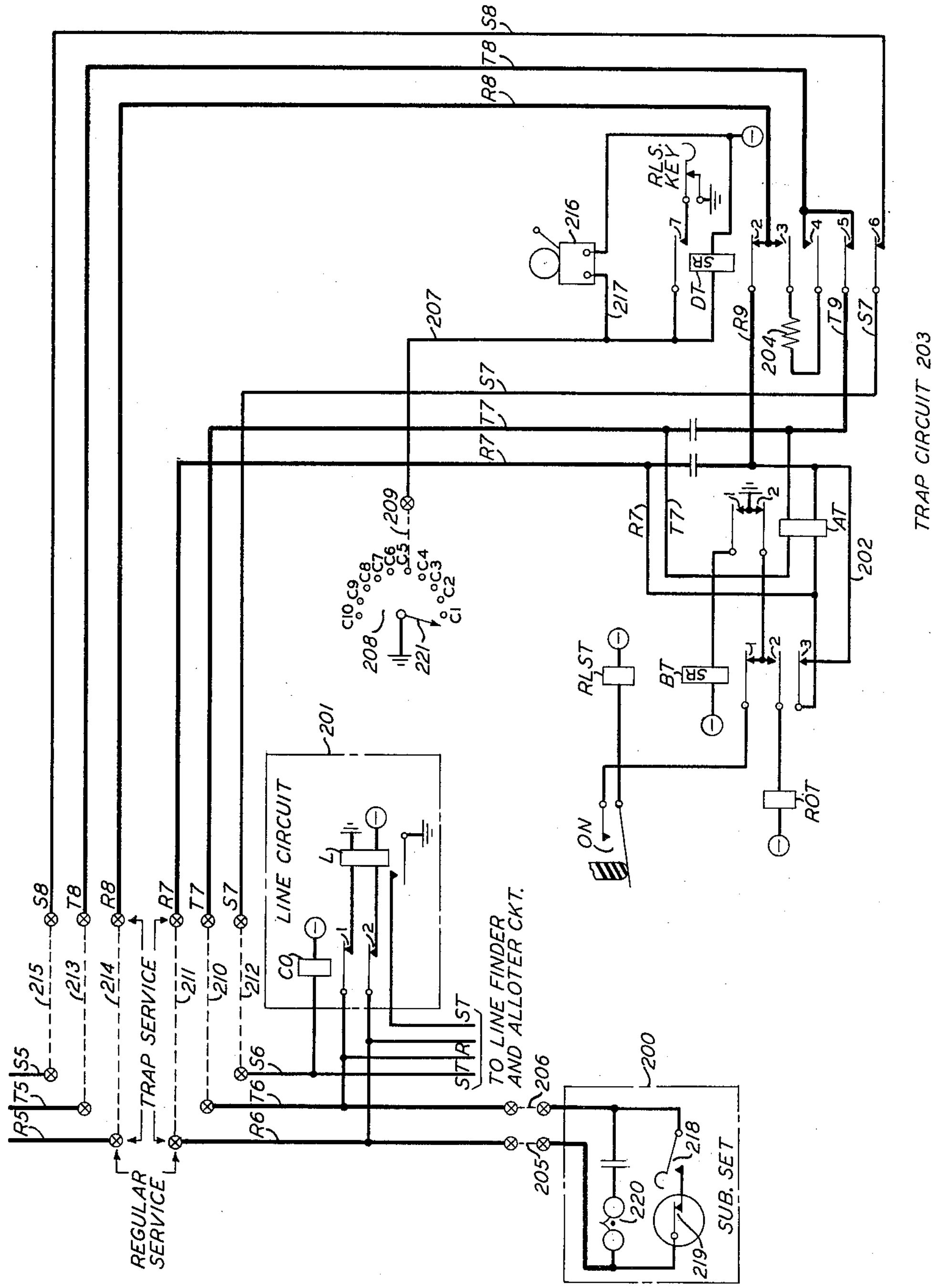

These and other objects and features will become apparent from the following detailed description with reference to the drawings in which FIG. 1 and FIG. 2, when placed with FIG. 1 above FIG. 2, depict my invention in a step-by-step telephone system.

FIG. 1 shows a schematic representation of a typical step-by-step switch train interconnecting calling subscriber 100 with called subscriber 200 in FIG. 2. This connection, as I have shown, comprises line finder 102, selector 103 and connector 104. To simplify the drawing and description I have purposely shown only that equipment in the switching system necessary to understand my invention. Furthermore, it will be obvious to those skilled in the art that additional selector switches and other auxiliary equipment, not shown, may be used to set up a connection in some of larger exchanges where many special service features are provided. This, however, is not pertinent for the understanding of my invention.

When subscriber's station 100 is connected for service at the exchange, his line conductors are cross connected to line circuit 101 by cross-connection wires 105 and 106 on one of the distributing frames. Line circuit 101 can be any one of a well known variety and serves to initiate switching equipment, such as the line finder 102, whenever subscriber 100 desires to originate a call. Subscriber 200 is connected to his line circuit 201 by cross-connecting wires 205 and 206 in a similar manner; however, the line finder equipment for line circuit 201 has not been shown.

If provided with regular service, subscriber 200 is also connected directly to connector bank terminals 119, 120 and 121 of connector switch 104 via cross-connection wires (not shown) between conductors S5, T5, R5 and conductors S6, T6, R6. Subscriber 100 is connected to similar connector bank terminals (not shown) in a like manner over conductors 128. Connector bank terminals provide the termination of a subscriber's line through which the subscriber can receive terminating calls.

If, however, subscriber 200 desires service whereby he can hold or trap calls to his line, the central office attendant removes the regular cross-connection wires from between conductors T5, R5, S5 and T6, R6, S6 and connects new cross-connection wires 210, 211 and 212 from conductors T6, R6, S6 of the line circuit 201 to conductors T7, R7, S7 of trap circuit 203 and new cross-connection wires 213, 214, and 215 from conductors T5, R5, S5 of connector bank 111 to conductors T8, R8, S8 of trap circuit 203. The attendant also connects conductor 207 of trap circuit detecting relay DT to one of terminals C2 through C10 on the multicontact terminal bank of rotary switch 208 using cross-connection wire 209, which I have shown connected to terminal C5 of rotary switch 208.

Each stepped position of switch 208, as denoted by each of terminals C2 through C10, represents a code that may be assigned to the called subscriber for trapping purposes. The one that I have shown connected is code digit "5" which may be dialed by the called subscriber to actuate the trap circuit when he desires to hold a connection. The assigned code is known only to the attendant and those authorized to hold connections, thus preventing any malicious or accidental holding of connections by unauthorized persons using the called line.

Of course, it will be understood by those skilled in the art that many other multicondition mechanisms can readily be substituted for the translating and decoding rotary switch 208. One obvious substitution could be made using a two position switch similar to the well known step-by-step connector switch. This substituted arrangement would provide many additional codes of a two or three digit nature.

The attendant now places a trap plug 107 in test jack 108 for each of the connector switches like 104 that have access to subscriber 200. Trap plug 107 comprises a diode 109, a resistance 110, and a suitable plug arrangement 129 that is compatible with test jack 108. Trap plug 107 is arranged so that diode 109 is in a high impedance condition whenever called supervisory relay D is released and a low impedance condition whenever called subscriber supervisory relay D is operated. This is accomplished by changing the orientation of the applied positive and negative potentials with respect to the anode and cathode of the diode. In effect, this plug assembly acts as an impedance gating device as will appear from the subsequent description. For instance, when the D relay is normal the battery and ground are applied to the plug as follows: negative potential through the upper winding of the A relay, over conductor 113, thence through normally made contacts 1 of the D relay and over conductors 127 and R3 to the anode of diode 109 and positive potential through the lower winding of the A relay, over conductor 114, thence through normally made contacts 3 of the D relay and over conductors 126 and T3, thence through resistance 110, and to the cathode of diode 109. Negative potential on the anode and positive potential on the cathode places diode 109 in a high impedance condition, and any current that may flow through the diode in this condition is not sufficient to operate the A relay.

If called supervisory relay D is operated, such as when the called subscriber answers, the polarity of the applied potential with respect to diode 109 is reversed, and diode 109 is now in a low impedance condition, namely the anode of diode 109 now being connected to positive potential on the lower winding of the A relay, over conductor 116 and through operated contacts 2 of the D relay, and the cathode of diode 109 now being connected to negative potential through the upper winding of the A relay, over conductor 115 and through operated contacts 4 of the D relay. This low impedance condition of diode 109 will serve to put an artificial bridge across calling supervisory relay A and hold the A relay operated as long as called supervisory relay D remains operated.

It will be understood that other plug arrangements can be used in lieu of the resistance diode combination across both windings of the A relay as I have shown. For instance, one might desire to connect the anode of diode 109 directly to a local ground or to sleeve S3 of the jack. This would accomplish the same results by holding the A relay operated using only the upper winding.

For the purpose of illustrating how a call can be trapped, let it be assumed that calling subscriber 100 has extended a talking connection through the step-by-step switch train to signal called subscriber 200 and that called subscriber 200 is provided with the trapping service by having trap circuit 203 connected between his line circuit 201 and his regular connector bank terminals 119, 120 and 121 in the manner described above.

In addition, let it be assumed that plug 107 is inserted in jack 108, and that cross-connection wire 209 is connected to terminal C5 of rotary switch 208 so that it is necessary for subscriber 200 to dial the digit "5" to actuate the trap circuit.

Under these circumstances, a low impedance closed calling subscriber's loop is formed operating calling supervisory relay A over the following path: negative battery through the upper winding of relay A, over conductor 113, through normally made contacts 1 of the D relay, thence over conductors 127 and R3 to selector switch 103, through equipment (not shown) in selector 103 to conductor R2, and through equipment (not shown) in line finder 102 to conductor R1, through equipment (not shown) in line circuit 101, to conductor R and over cross-connection wire 106, thence through normally made dial contacts 125, operated switchhook contacts 124, thence back over cross-connection wire 105, over conductor T, through equipment in line circuit 101 and over conductor T1, through equipment in line finder 102 and over conductor T2, through equipment in selector 103 and over conductors T3 and 126, thence through the normally made contacts 3 of relay D, over conductor 114 and through the lower winding of the A relay to ground. Both windings of the A relay are energized, and relay A operates.

It will be remembered that plug arrangement 107 is also connected by jack 108 to the T3 and R3 conductors in parallel with the calling subscriber's switchhook and dial contacts. However, as previously described, this diode resistance network is in a high impedance condition at this time and has little or no effect on the operation of the A relay.

At contacts 1, relay A completes the operating path for relay B over an obvious circuit. At contacts 2 of the B relay, the operating path of connector release magnet RLSC is interrupted, thus preventing the connector switch from releasing. In addition, the B relay extends ground through its operated contacts 1, and over control conductor S3 to hold operated the DSEL relay in selector 103. The DSEL relay, at its contacts 2, interrupts the operating path of selector release magnet RLS, and at its contacts 1, extends ground over control conductor S2 to establish a locking path for the F relay in line finder 102.

Although not described herein, relay F was initially operated when the connection between subscribers 100 and 200 was established. For simplicity the complete operating paths for this and other relays in the more familiar step-by-step switching circuits have not been shown. Instead I have represented the omitted equipment by dash lines since its presence is not necessary for an understanding of my invention and the operation of step-by-step switching equipment is so well known in the art.

Line finder relay F, at contacts 2, opens the operating path for line finder release magnet RLS–LF to prevent the line finder switch from releasing. At contacts 1 of the F relay, ground is extended from the previously traced path over control conductor S1 to the winding of line cut-off relay CO1 to hold subscriber line 100 busy.

It will now be apparent that the B relay, under control of the calling supervisory relay A, will hold the entire switch train operated and prevent the release of line finder switch 102, selector switch 103, connector switch 104, and calling subscriber cut-off relay CO1.

When the connector switch 104 was actuated by the calling subscriber's dial to set upon connector bank terminals 119, 120 and 121 of called subscriber 200, a ground was also extended from connector equipment (not shown) over conductor S4, through connector bank terminal 119, over conductor S5, thence over cross-connection wire 215, over conductor S8 and through contacts 6 of the DT relay, over conductor S7, over cross-connection wire 212, thence over conductor S6 and through the winding of subscriber cut-off relay CO to negative battery. Relay CO operates, and at contacts 1 and 2 prevents line relay L from operating and seizing a line finder circuit if subscriber 200 should now go off hook.

A central office ringing signal is now applied (from a source not shown) over conductors 112 and 117 to conductors R4 and T4 and through the trap circuit 203 to the subscriber's ringer 220. The trap circuit does not operate at this time, but when subscriber 200 lifts his receiver to trip the central office ringing by closing switchhook contacts 218 and causing his line to assume a low impedance condition, a closed called subscriber's loop is formed operating called supervisory relay D in connector 104 and also operating pulse responsive relay AT in trap circuit 203. The energizing path for these relays is as follows: negative battery through the lower winding of relay D, over conductor 117, over conductor T4, through connector bank contact 120, over conductor T5, thence over cross-connection wire 213, over conductor T8, through normally made contacts 5 of relay DT, over conductor T9, through the upper winding of pulsing relay AT, thence over conductor T7, over cross-connection wire 210 to conductor T6, over cross-connection wire 206, through operated switchhook contacts 218, through normally made dial contacts 219, back over cross-connection wire 205, over conductor R6, thence over cross-connection wire 211, over conductor R7, through normally made contacts 3 of the BT relay and over conductor 202, thence over conductor R9, through normally made contacts 2 of relay DT, over conductor R8, thence over cross-connection wire 214 and conductor R5 to connector bank terminal 121, over conductor R4, over conductor 112 and through the upper winding of relay D to ground.

The D relay in operating, reverses the battery and ground in the calling loop so that diode 109 is now in a low impedance condition. The resistance 110 and diode 109 combination now provides an artificial closed calling loop to hold relay A operated under control of the operated D relay, even though subscriber 100 attempts to disconnect by opening his switchhook contacts 124.

Relay AT in the trap circuit closes its contacts 1 to operate the slow release BT relay over an obvious path and opens its contacts 2 which do nothing at this time.

At contacts 1, relay BT opens the operating path for the rotary switch release magnet RLS. Contacts 3 of the BT relay, in opening, remove the shunt path around the lower winding of the AT relay. From a more practical standpoint, it is preferred that one winding of the AT relay be shunted to reduce the called loop impedance during ringing and ringing trip. This assures positive operation of the called station ringer and the connector ringing trip relay over the longest called loop anticipated. However, afer the ringing signal is tripped, battery and ground from the winding of the D relay are connected to the called loop. Upon operation of the AT relay followed by the BT relay, the lower winding of the AT relay is made effective so that both windings of the AT relay can be used for optimum pulse following.

The BT relay, at contacts 2, also prepares the operating path of rotary stepping magnet ROT.

A talking path is now established between the previously traced calling subscriber's loop and the previously traced called subscriber's loop via capacitors 122 and 123.

If from the nature of the call, the called subscriber decides to release himself from the connection and hold the calling subscriber, he merely dials the preassigned code digit "5." With each interruption of the called loop, as dial contacts 219 are intermittently opened to cause the line to assume a high impedance condition, the AT relay releases, closing its contacts 2. The BT relay being slow-to-release, will not release during pulsing, and a path is completed for operating rotary magnet ROT each time the AT relay releases. This path is traced as follows: negative battery through the winding of the ROT magnet, through contacts 2 of the B relay operated and through contacts 2 of the released A relay to ground.

ROT magnet drives a pawl and ratchet mechanism (not shown) to direct wiper arm 221 over contacts C1 through C10 in a well known manner.

When wiper 221 steps off-normal to the first rotary position, off-normal contacts ON close to prepare the operating path for rotary switch release magnet RLST which does not operate at this time.

Since subscriber 200 dialed the digit "5," wiper arm 221 will come to rest on contact C5 and extend ground over cross-connection wire 209, over conductor 207, and through the winding of detecting relay DT, to negative battery. The winding is energized, and detecting relay DT operates.

Ground from wiper 221 is also extended over conductor 217 to energize alarm bell 216 and signal the attendant that a call is to be traced.

Upon operating, the DT relay does the following: (1) at contacts 2 and 5 it opens the called subscriber's loop disconnecting the called subscriber's talking wires and the AT relay from the connection, (2) at contacts 3 and 4 it closes the called subscriber's loop by connecting resistance bridging network 204 across the T8 and R8 conductors in lieu of the called subscriber's switchhook contacts 218 and dial contacts 219, (3) locks to the ground over its contacts 7 and the normal RLS release key, and (4) opens at its contacts 6, the operating path of cut-off relay CO for subscriber 200.

With its operating path open, relay CO releases and reconnects subscriber line relay L to subscriber 200.

If subscriber 200 now wishes to place another call, he keeps his receiver off-hook operating the L relay which places a ground on start lead ST to an associated line finder and allotter circuit.

When contacts 2 and 5 of relay DT disconnected the AT relay from the called loop, the AT relay released, releasing the slow-to-release BT relay. With the AT and BT released, an operating path for the RLST release magnet is completed from ground through contacts 2 of the AT relay, through contacts 1 of the BT relay, through operated ON contacts, and through the winding of the RLST magnet to negative battery. Upon operating, magnet RLST releases rotary switch 208 and restores it to normal in a well known manner.

The original operating path for alarm bell 216 and relay DT is interrupted when rotary switch 208 releases, but relay DT and bell 216 will remain operated under control of the normal RLS key.

The attendant can now trace the connection, which remains established until the RLS key is operated. When he has determined the origin of the call, the attendant operates the RLS key releasing the DT relay and silencing alarm 216. The DT relay, in releasing interrupts the substituted called loop by disconnecting resistance bridging network 204 from conductors T8 and R8 and restores the trap circuit to normal for subsequent use.

With the called loop opened, i.e., in a high impedance condition, the D relay of connector 104 releases, restoring the battery and ground potentials in the calling loop to a normal condition whereby plug 107 again offers a high impedance bridge across the calling loop. If the calling subscriber has already replaced his receiver, the calling loop will be open (disregarding high impedance ringer 130) at switchhook contacts 124, and with the diode now in its high impedance condition, the A relay will release. The A relay, in releasing, releases the B relay which removes the holding ground from the S3 control conductor releasing the D-SEL and F relays. The B relay, in releasing, also closes through the operating path for the RLSC magnet which restores the connector switch 104 to normal.

The DSEL and F relays, upon releasing, close through operating paths for release magnets RLS and RLS-LF respectively, thereby causing selector 103, line finder 102 and subscriber's cut-off relay CO1 to restore to normal.

The occasion may arise whereby subscriber 200 would also like to receive calls, in addition to being able to originate calls, while a particular terminating call is trapped to his regular connector terminals. This service can be provided by connecting his conductors T6, R6 and S6 directly to an alternate set of connector bank terminals in addition to the trapped terminals 120, 121 and 119 normally assigned to his line. This service feature is well known in the art and necessitates the dialing of the alternate telephone number if the regular number is busy while being held on a trapped call.

From the foregoing description it will be apparent that I have provided a call holding arrangement that enables a called subscriber to trap annoyance calls without rendering his line out of service while the call is being traced. It will also be apparent that my circuit offers complete flexibility, simplicity and many features including certain means for safeguarding the service from misuse by unauthorized persons.

While I have described here a preferred embodiment of my invention, it will be understood that various changes may be made therein without detracting from the true spirit and scope of my invention.

What is claimed is:

1. In a telephone system having automatic switching equipment operated to establish an interconnection between a calling line and a called line and releasable to disestablish a said interconnection; holding means operated incident to the establishment of a said interconnection to hold said equipment operated, said holding means being releasable to release said equipment; a telephone dial connected to said called line; and circuit means controlled by said dial for automatically disconnecting said called line from said interconnection and for placing the release of said holding means under the control of said circuit means.

2. In a telephone system having automatic switching equipment operated to establish an interconnection between a calling line and a called line and releasable to disestablish a said interconnection; holding means operated incident to the establishment of a said interconnection to hold said equipment operated, said holding means being releasable to release said equipment; a telephone dial for transmitting different signals on said called line; and circuit means responsive to a particular signal from said dial for automatically disconnecting said called line from said interconnection and for placing the release of said holding means under control of said circuit means.

3. In a telephone system having automatic switching equipment operated to establish an interconnection between a calling line and a called line and releasable to disestablish a said interconnection; holding means operated incident to the establishment of a said interconnection to hold said equipment operated, said holding means being releasable to release said equipment; means for transmitting coded signals on said called line; and circuit means responsive to said coded signals for translating said coded signals and effective incident to translation of a predetermined one of said singals for automatically disconnecting said called line from said interconnection and for placing the release of said holding means under control of said circuit means.

4. The invention defined in claim 3 wherein said translating means comprises a multicondition device and control means responsive to said coded signals for causing said device to assume a condition representative of said coded signals, and wherein said predetermined indication is indicative of a particular one of said conditions.

5. The invention defined in claim 4 wherein said device is a multiposition stepping device; wherein said control means compresses means responsive to any said signal for stepping said device to a corresponding position; and wherein said predetermined indication is a particular one of said stepped positions.

6. In a telephone system having automatic switching equipment operated to establish an interconnection between a calling line and a called line and releasable to disestablish a said interconnection; holding means operated incident to the establishment of a said interconnection to hold said equipment operated, said holding means normally being releasable under control of said calling line to release said equipment; means for placing the release of said holding means under the control of said called line; a telephone dial connected to said called line; and circuit means controlled by said dial for automatically disconnecting said called line from said interconnection and for placing the release of said holding means under the control of said circuit means.

7. In a telephone system having automatic switching equipment operated to establish an interconnection between a calling line and a called line and releasable to disestablish a said interconnection; holding means operated incident to the establishment of a said interconnection to hold said equipment operated, said holding means being normally releasable under control of said calling line to release said equipment; means for placing the release of said holding means under the control of said called line; a telephone dial for transmitting different signals on said called line; and circuit means responsive to a particular signal from said dial for automatically disconnecting said called line from said interconnection and for placing the release of said holding means under control of said circuit means.

8. In a telephone system having automatic switching equipment operated to establish an interconnection between a calling line and a called line and releasable to disestablish a said interconnection; holding means operated incident to the establishment of a said interconnection to hold said equipment operated, said holding means being releasable to release said equipment; means for placing the release of said holding means under the control of said called line; means for transmitting coded signals on said called line; and circuit means responsive to said coded signals for translating said coded signals and effective incident to translation of a predetermined one of said signals for automatically disconnecting said called line from said interconnection and for placing the release of said holding means under control of said circuit means.

9. In a telephone system having automatic switching equipment operated to establish an interconnection between a calling line and a called line and releasable to disestablish a said interconnection; holding means operated incident to the establishment of a said interconnection to hold said equipment operated, said holding means being releasable to release said equipment; means for placing the release of said holding means under the control of said called line; means for transmitting coded signals on said called line; and circuit means comprising a bridging network, translating means responsive to any coded signal for translating said signal into an indication representative of said signal, detecting means for detecting a particular predetermined indication, and transfer means under control of said detecting means for automatically disconnecting said called line from said interconnection and for transferring the control of the release of said holding means to said network.

10. The invention defined in claim 9 wherein said translating means comprises a multicondition device and control means responsive to said coded signals for causing said device to assume a condition representative of a said coded signal, and wherein said predetermined indication is indicative of a particular one of said conditions.

11. The invention defined in claim 10 wherein said device is a multiposition stepping device; wherein said control means is responsive to any said signal for stepping said device to a corresponding stepped position; and wherein said predetermined indication is a particular one of said stepped positions.

12. In a telephone system having automatic switching equipment operated to establish an interconnection between a calling line and a called line and releasable to disestablish a said interconnection; holding means operated incident to the establishment of a said interconnection to hold said equipment operated, said holding means being releasable to release said equipment; means for placing the release of said holding means under the control of said called line; means for transmitting on said called line coded signals each comprising a series of intermittent signals; translating means comprising control means including a first relay successively operated and released by said intermittent signals and including a second relay slower-to-release than said first relay, said second relay operative in response to the initial operation of said first relay and capable of remaining operated during the remaining successive operated and released conditions of said first relay, said translating means further comprising a rotary stepping switch having an arcuate multicontact bank and a wiper thereon, said wiper capable of being successively engaged with each of said bank contacts one at a time under control of said operated second relay and said intermittently released first relay; detecting means comprising a detecting relay winding selectively connectable to any of said bank contacts and energized when said wiper engages a said connected bank contact and stops thereon as determined by the number of intermittent signals in a predetermined one of said series; transfer means comprising contacts of said detecting relay; and a bridging network comprising a resistance connected to certain of said detecting relay contacts.

13. In a telephone system having automatic switching equipment operated to establish an interconnection between a calling line and a called line and releasable to disestablish a said interconnection and wherein each of said lines has a station thereon, each said station comprising a high impedance and a low impedance and means for selectively rendering effective each of said impedances one at a time to cause a corresponding impedance change in said respective line, holding means comprising relay means operated incident to the establishment of said interconnection and responsive to said calling line low impedance for holding said equipment operated and normally responsive to said calling line high impedance for releasing said equipment whenever said called line is in a high impedance condition, means comprising gating circuitry selectively connectable to certain of said switching equipment and responsive to said called line low impedance for placing the release of said holding means under the control of said called line irrespective of the impedance condition of said calling line, and circuit means comprising a low impedance bridging network and controlled by said called line for automatically disconnecting said called line from said interconnection and for connecting said network to said interconnection for controlling the release of said holding means thereby to maintain said interconnection independently of the impedance conditions of said calling and called lines.

14. In a telephone system having automatic switching equipment operated to establish an interconnection between a calling line and a called line and releasable to disestablish a said interconnection and wherein each of said lines has a station thereon comprising a high impedance and a low impedance and means for selectively rendering effective each of said impedances one at a time to cause a corresponding impedance change in said respective line, holding means comprising relay means operated incident to the establishment of said interconnection and responsive to said calling line low impedance for holding said equipment operated and normally responsive to said calling line high impedance for releasing said equipment whenever said called line is in a high impedance condition, means comprising gating circuitry selectively connectable to certain of said switching equipment and responsive to said called line low impedance for placing the release of said holding means under the control of said called line irrespective of the impedance condition of said calling line, means at said called station for intermittently rendering effective a high and low impedance conidtion in said called line, and circuit means responsive to a series of impedance changes for automatically disconnecting said called line from said interconnection and for placing the release of said holding means under control of said circuit means.

15. In a telephone system having automatic switching equipment operated to establish an interconnection between a calling line and a called line and releasable to disestablish a said interconnection and wherein each of said lines has a station thereon comprising a high impedance and a low impedance and means for selectively rendering effective each of said impedances one at a time to cause a corresponding impedance change in said respective line; holding means comprising relay means operated incident to the establishment of said interconnection and responsive to said calling line low impedance for holding said equipment operated and normally responsive to said calling line high impedance for releasing said equipment whenever said called line is in a high impedance condition; means comprising gating circuitry selectively connectable to certain of said equipment and responsive to said called line low impedance for placing the release of said holding means under the control of said called line irrespective of the impedance condition of said calling line; means at said called station for transmitting signals on said called line by intermittently effecting a series of high and low impedance conditions in said called line; and circuit means comprising a low impedance bridging network, translating means responsive to said impedance changes in said called line for translating said changes into indications representative of signals, detecting means for detecting a particular predetermined indication, and transfer means under control of said detecting means for automatically disconnecting said called line from said interconnection and transferring the control of the release of said holding means to said low impedance network.

16. The invention defined in claim 15 wherein said translating means comprises a multicondition device and control means, said control means being intermittently effective under control of a said series of impedance changes for causing said device to assume a condition representative of a said series and wherein said predetermined indication is indicative of a particular one of said conditions.

17. This invention defined in claim 16 wherein said translating means comprises a multiposition stepping device; wherein said control means is responsive to said intermittent called line impedance changes for stepping said device to a position indicative of the series of said impedance changes transmitted; and wherein said predetermined indication is a particular one of said stepped positions.

18. The invention defined in claim 17 wherein said transmitting means comprises a telephone station dial; wherein said high and low impedance conditions represent dial pulses; wherein said control means comprises a first relay successively operated and released by said dial pulses and a second relay slower-to-release than said first relay, said second relay operative in response to the initial operation of said first relay and capable of remaining operated during pulsing of said first relay; wherein said stepping device comprises a rotary switch comprising an arcuate multicontact bank and a wiper thereon, said wiper capable of being successively engaged with each of said bank contacts one at a time under control of said operated second relay and said intermittently released first relay; wherein said detecting means comprises a detecting relay winding selectively connectable to any of said bank contacts and energized when said wiper engages a said connected bank contact and stops thereon as determined by a predetermined number of dial pulses transmitted; wherein said transfer means comprises detecting relay contacts controlled by said detecting relay winding; wherein said network comprises resistance connected to certain of said detecting relay contacts.

19. In a telephone system having automatic switching equipment operated to establish an interconnection between a calling line and a called line and releasable to disestablish a said interconnection, wherein each of said lines has a station thereon comprising operative dial contacts and operative switchhook contacts; said interconnection including a closed called loop comprising closed called station switchhook contacts, closed called station dial contacts, and a called supervisory relay having windings and contacts controlled thereby, said called supervisory relay being operated when said called loop is closed and released when said called loop is interrupted by the opening of any said called station contacts; said interconnection also including a closed calling loop comprising closed calling station switchhook contacts, closed calling station dial contacts, a calling supervisory relay and said called supervisory relay contacts, said calling supervisory relay being operated when said calling loop is closed and released when said calling loop is interrupted by the opening of any said calling station contacts; holding means controlled by said calling supervisory relay and operative incident to the establishment of a said interconnection for holding said equipment operated, said holding means normally responsive to an interruption in said calling loop for releasing said equipment whenever said calling supervisory relay is released; a unidirectional current carrying device connectable to said calling supervisory relay and controlled by said called supervisory relay contacts and effective under the control of said operated called supervisory relay to provide an artificial closed calling loop independent of said calling station contacts; and circuit means comprising a pulsing relay connected to said called loop, said pulsing relay operated when said called loop is closed and released when said called loop is open and successively operated and released whenever said called station dial contacts are intermittently closed and opened, a slow-to-release relay operated by the initial operation of said pulsing relay and capable of remaining operated during said successive releases of said first relay, a rotary switch having a multicontact bank and a wiper thereon, directing means intermittently operated when said pulsing relay is successively released while said slow-to-release relay is operated for effectively directing said wiper over said arcuate bank so as to engage said wiper with each of said bank contacts one at a time, an operable detecting relay having a winding selectively connected to any said bank contact, said winding being energized when said wiper engages a said connected bank contact and stops thereon under control of said directing means, a resistance bridge, transfer contacts connected to said called loop and controlled by said detecting relay winding for transferring the control of said called supervisory relay from said called line to said bridge, wherein said bridge provides a closed called loop to hold said called supervisory relay operated independently of said called line, and releasing means operative to release said switch and said detecting means and to remove said bridge from the control of said called supervisory relay thereby to release a said hold interconnection.

20. The invention defined in claim 19 wherein said switching equipment comprises step-by-step telephone switching equipment comprising a connector switch, said connector switch comprising a test jack and connector bank terminals; wherein said called line comprises a line circuit; wherein said circuit means is connectable between said line circuit and said connector bank terminals; wherein said unidirectional current carrying device comprises a plug having two terminals, a diode having an anode and a cathode, and a resistor having two terminals, said first plug terminal being connected to said diode anode, said diode cathode being connected to said first resistor terminal, said second resistor terminal being connected to said second plug terminal and said plug capable of being inserted into said jack; wherein said directing means comprises a rotary magnet; and wherein said releasing means comprises a release key, a switch release magnet and off-normal contacts of said rotary switch.

References Cited in the file of this patent

UNITED STATES PATENTS

| | | |
|---|---|---|
| 2,070,874 | Voss et al. | Feb. 16, 1937 |
| 2,077,537 | Taylor | Apr. 20, 1937 |
| 2,879,338 | Joel et al. | Mar. 24, 1959 |
| 3,015,698 | Pedrick | Jan. 3, 1962 |